(12) United States Patent
Housel

(10) Patent No.: US 7,184,154 B1
(45) Date of Patent: Feb. 27, 2007

(54) METHOD OF GENERATING PRINTER SETUP INSTRUCTIONS

(75) Inventor: Edward M. Housel, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 971 days.

(21) Appl. No.: 09/692,645

(22) Filed: Oct. 19, 2000

(51) Int. Cl.
*G06F 15/02* (2006.01)
*G06F 3/01* (2006.01)

(52) U.S. Cl. .................... 358/1.13; 358/1.15; 358/1.14

(58) Field of Classification Search .......... 358/1.1–1.9, 358/1.11–1.18
See application file for complete search history.

(56) References Cited

U.S. PATENT DOCUMENTS

| | | | |
|---|---|---|---|
| 4,541,337 A | 9/1985 | Schaul | 101/227 |
| 4,862,200 A | 8/1989 | Hicks | 396/311 |
| 4,987,447 A | 1/1991 | Ojha | 399/84 |
| 5,130,806 A | 7/1992 | Reed et al. | 358/296 |
| 5,172,326 A * | 12/1992 | Campbell, Jr. et al. | 364/470 |
| 5,243,381 A | 9/1993 | Hube | 399/84 |
| 5,263,129 A * | 11/1993 | Ikegaya et al. | 358/1.18 |
| 5,283,752 A | 2/1994 | Gombault et al. | 700/221 |
| 5,436,730 A | 7/1995 | Hube | 358/401 |
| 5,442,732 A * | 8/1995 | Matysek et al. | 358/1.17 |
| 5,455,681 A * | 10/1995 | Ng | 358/298 |
| 5,461,469 A | 10/1995 | Farrell et al. | 399/407 |
| 5,525,031 A | 6/1996 | Fox | 414/789.7 |
| 5,615,015 A | 3/1997 | Krist et al. | 358/296 |
| 5,715,381 A | 2/1998 | Hamilton | 358/1.15 |
| 5,798,738 A * | 8/1998 | Yamada | 345/2 |
| 5,822,506 A * | 10/1998 | Chen et al. | 358/1.15 |
| 5,878,237 A * | 3/1999 | Olarig | 395/308 |
| 6,018,774 A * | 1/2000 | Mayle et al. | 709/250 |
| 6,041,200 A | 3/2000 | Glass et al. | 399/82 |

FOREIGN PATENT DOCUMENTS

EP    0 708 548    4/1996

* cited by examiner

*Primary Examiner*—King Y. Poon
(74) *Attorney, Agent, or Firm*—Justin D. Petruzzelli

(57) ABSTRACT

The invention is an improved method of generating setup instructions for use with a printing system having connected thereto one or more finishing devices. The inventions involves printing a sheet of setup instructions which the operator carries to the finishing device to be setup, so that the operator may refer to the printed instructions while setting up the finishing device. The printed sheet allows more extensive, clear instructions to be communicated to the operator than is possible on the printer user interface. The method also involves automatically placing one or more print jobs on hold during setup, until the operator has finished setting up the system and released the job.

3 Claims, 3 Drawing Sheets

METHOD OF GENERATING PRINTER SETUP INSTRUCTIONS

BACKGROUND OF THE INVENTION

1. Field of the Invention

This invention relates to a method of generating printer setup instructions and controlling a printer having attached finishing devices. More particularly, this invention relates to a method of generating a printed instruction sheet listing the setup instructions for finishing devices attached to the printer, allowing the setup operator to carry the printed instruction sheet to the user interface on the finishing device to input the setup instructions, without having to input the instructions from memory. Additionally, the method provides for coordination of the setup instructions with a particular print job by automatically placing all print jobs in a hold state until the operator releases the print job.

2. Brief Description of the Related Art

High-speed printers and copiers are often connected to so-called "finishing devices," such as a perfect binding machine, three-hole punch and the like. Each of the finishing devices connected to the printer must be setup for a particular print job. For example, a hole punch may have mechanical detents that must be set to a predetermined configuration for a given print job. These finishing devices are connected to the printer by a simple electrical connection, consisting of a relatively small number of wires. Thus, the electrical connection between the printer and the finishing device may be capable of signaling a paper jam in the finishing device or an out-of-paper condition, but is not capable of transmitting or receiving large amounts of data or more sophisticated messages to or from the printer logic control unit (LCU). Moreover, the finishing device may be made by a third-party manufacturer and, therefore, there may be no means for even rudimentary control of the finishing device through the printer LCU. Because of these limitations, current printer systems do not provide for entry of finishing device setup instructions through the printer user interface.

In the case of a stand-alone network printer, the print jobs are submitted through the network. Alternatively, the print job could be entered through the printer user interface. In any event, when the print job is submitted through the network or printer user interface, the submitter enters certain data, often referred to as job ticket data, that includes information about certain characteristics of the job, such as paper size, and paper handling and finishing instructions, including setup instructions for the necessary finishing devices to be used in completing the print job. Such setup information is generally entered in an operator message that will be displayed on the printer user interface when the job arrives at the printer.

When a print job is entered through the network interface, the job is placed in a print server queue on the network, until a slot opens in the raster image processor (RIP) queue in the printer system. When the print job is transferred to the RIP queue, it is assigned a print job number and the RIP generates an operator message, if one is associated with the print job. The setup instructions for a given print job are displayed on the printer user interface as an operator message. The operator message informs the operator that a certain print job requires custom finishing device setup, and specifies the particular finishing device setup parameters. However, as discussed above, while the finishing device setup instructions for a particular job are displayed on the printer user interface, it is impossible, given the current state of the art, to enter setup information for finishing devices through the printer user interface. Moreover, typical printer user interfaces allow the display of only a limited amount of information in an operator message, for example sixty-three characters, thereby imposing restrictions on the amount of instructions that may displayed at a given time on the printer user interface. This results in a limited amount of information being provided to the operator, possibly in a cryptic, abbreviated fashion, making it difficult for inexperienced operators to properly setup the machine and making it more likely that even experienced operators will misunderstand the instructions.

Typical arrangements of printer systems often place the finishing devices some twenty to thirty feet from the printer user interface. Thus, the operator is required to read the setup instructions from the printer user interface, quickly memorize the setup instructions for one or more finishing devices, walk to the finishing devices and enter the individual setup instructions for each print job. This limitation introduces the potential for human error, in that the operator must accurately recall and enter the setup instructions for a particular job at a location remote to where the instructions are displayed. At the high print volumes made possible by high-speed, high-capacity printer systems, human error in the setup of finishing devices can result in expensive wasted print runs, where, for example, the hole punch is setup incorrectly and places the holes in other than the desired locations. Furthermore, it is impossible for the operator to re-check the instructions he or she has entered without repeating the entire process, walking back to the printer user interface, re-reading the instructions, walking back to the finishing device and re-checking the instructions entered. In addition to the potential for human error, this process slows down the preparation and execution of print jobs, thus impairing overall productivity. Therefore, there is a need in the art for an improved method of displaying instructions that would minimize the reliance on operator memory and would minimize the amount of times the operator is required to walk back and forth between the printer user interface and the finishing devices. Additionally, there is a need in the art for an improved method of generating setup instructions that would increase the amount of information available to the operator.

Finally, the operator must perform all of the finishing device setup tasks individually on multiple print jobs that are processed sequentially through the print system at a high rate of speed. The potential therefore exists for a situation in which the operator sets up a given finishing device for particular print job while there are other print jobs in the marking engine queue that may not generate operator messages. The operator may therefore setup finishing devices for the first print job, and a later print job may come through the system before the operator is able to re-set the finishing devices for the later job, thus wasting the materials expended in the later print job.

Accordingly, there exists a need in the art for a method of setting up finishing devices for individual print jobs while preventing later print jobs that may be resident in the marking engine queue from being processed before the operator has re-set the finishing device parameters for the next print job.

SUMMARY OF THE INVENTION

In one embodiment, the invention is a method of performing setup operations on a finishing device connected to an electrophotographic printer, the printer having a printer user interface, in which a print job is entered into the printer, the print job including setup instructions for at least one finishing device written as an operator message. Following entry of such a print job, the printer system automatically prints an instruction sheet listing setup operations to be performed prior to completing the print job and automatically places on hold all pending print jobs that specify the designated finishing device. Alternatively, the system could place all print jobs on hold, or could place on hold all jobs including operator instructions. The operator then performs the setup operations listed on the printed instruction sheet and, when setup is complete, enters a release code to thereby release the print job from hold and allow the printer to complete the print job.

In another embodiment, the method includes additional steps, wherein the printer accesses a database of setup instructions that are to be performed on the at least one finishing device, retrieves a file from the database containing instructions for a specified finishing device, reads and translates the file into a page description file that is rasterized and incorporated into the printed instruction sheet.

In an additional embodiment, the invention is a method of managing a printer system, including the steps of receiving a print job and determining whether the print job includes operator instructions. If the print job specifies a finishing device, the printer system determines whether the print job includes instructions directing an operator to perform specific setup operations and, if so, places all print jobs on hold and prints an instruction sheet listing a series of setup operations to be performed by the operator. The operator then performs the setup operations listed on the printed instruction sheet and, when setup is completed, the operator enters a code that removes the hold, allowing the print jobs to proceed.

DETAILED DESCRIPTION OF THE DRAWINGS AND PREFERRED EMBODIMENTS

Figure 1:
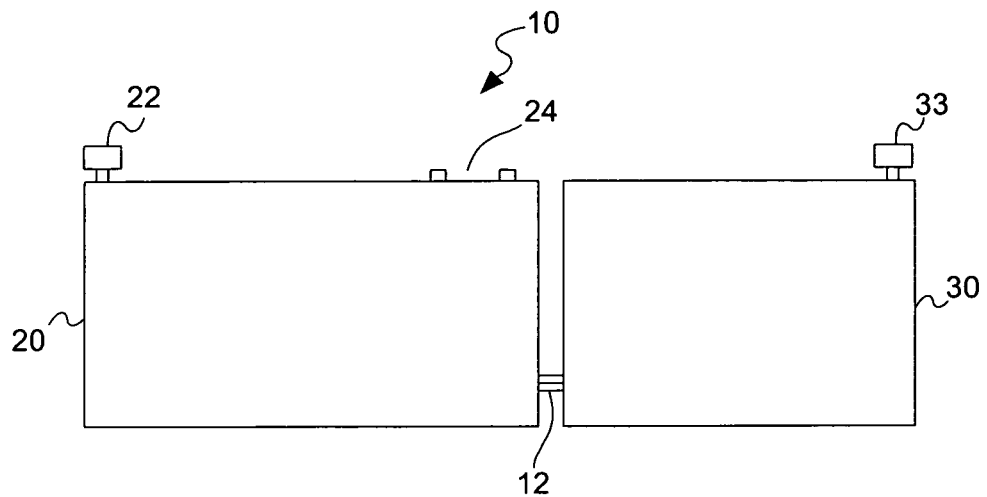
FIG. 1 is a diagrammatic representation of a printing system with attached finishing devices.
Figure 2:
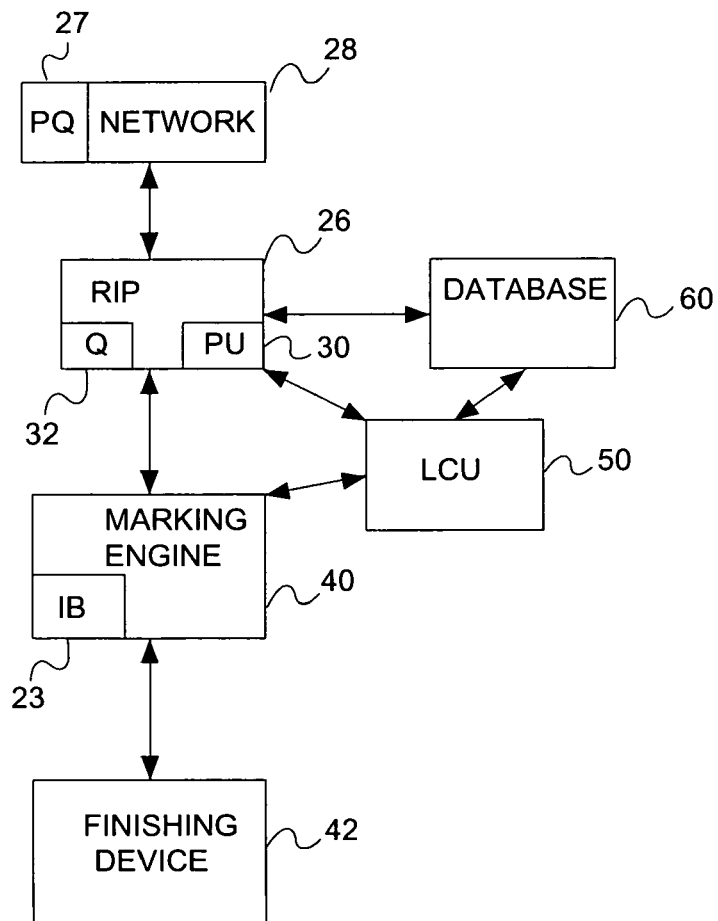
FIG. 2 is block diagram illustrating the architecture of a typical print system employing the present invention.

Referring to FIGS. 1 & 2, a typical print system 10 of the type employing the present invention includes a printer 20 having a printer user interface 22 and a top exit copy tray 24. While the exemplary print system 10 shown is a network printing system configured to receive remote input through a network connection, other configurations are contemplated and possible within the scope of the present invention For example, the printing system could be a stand alone printer, including a scanner for on-site image input. While a particular printer configuration is discussed herein, it is to be understood that the present invention may be incorporated in other printing system configurations.

The printer 20 includes a raster image processor 26 that receives incoming data from a network 28 to which the printer 20 is connected. Prior to being transferred to the raster image processor 26, the print job may be held in a print server queue 27 on the network 28. The raster image processor 26 includes processing unit 30, that receives control commands and data from the network 28. Control commands are translated into machine control language by the processing unit 30, while incoming print jobs and program codes are stored in a print job buffer 32, also referred to herein as the RIP queue.

The printer 20 also includes a marking engine 40, that incorporates standard paper handling and processing equipment necessary, for example, for producing images on output paper. The marking engine 40 receives and stores in a multiple page image buffer 23, a data stream, including image data and control data generated by the processing unit 30. The image data is processed and transmitted to a write head (not shown) for transfer to the output pages.

The marking engine 40 also includes output devices that transfer the printed out pages to one or more finishing devices 42 connected to the printer 20 by a simple electrical connection 12. The finishing device 42 includes a finishing device user interface 33. The finishing device 42 may be any commonly used finishing device, such as a hole punch or binder.

The printer 20 includes a logic control unit 50, including a printer user interface 22, through which the operator inputs functions and receives messages from the printer 20. The printer 20 also includes a database 60 of shared instructions, stored on a local disk, accessed by the RIP. The instructions stored in the database include, for example, setup instructions for a particular finishing device that are to be followed by the operator in all cases, regardless of the particular configuration chosen. Generally, these instructions will include directions as to how to physically set up a given finishing device. For example, a hole punch may have detents that must be physically moved to a desired position, but are secured by spring-loaded pins that must be removed prior to moving the detents. Likewise, the shared instructions may remind the operator to power down a particular finishing device prior to performing setup operations thereon, should that step be necessary.

Furthermore, because the shared instructions are stored on a local disk, the end-user may alter the shared instructions stored thereon to suit the end-user's individual needs. Typically, the database will include one file for each commonly encountered finishing device, in as many different languages, i.e., English, French, Spanish, etc., as desired, a separate file for each such language. In practice, when the job submitter includes text in the instruction field of the job entry menu on the network, this text directs the RIP to retrieve the file for the appropriate finishing device identified in the instructions. The RIP retrieves and reads the disk file in the appropriate language for the selected finishing device, translates the file into a page description file that is rasterized and incorporated into the user instructions that are printed as the instruction sheet.

Figure 3:
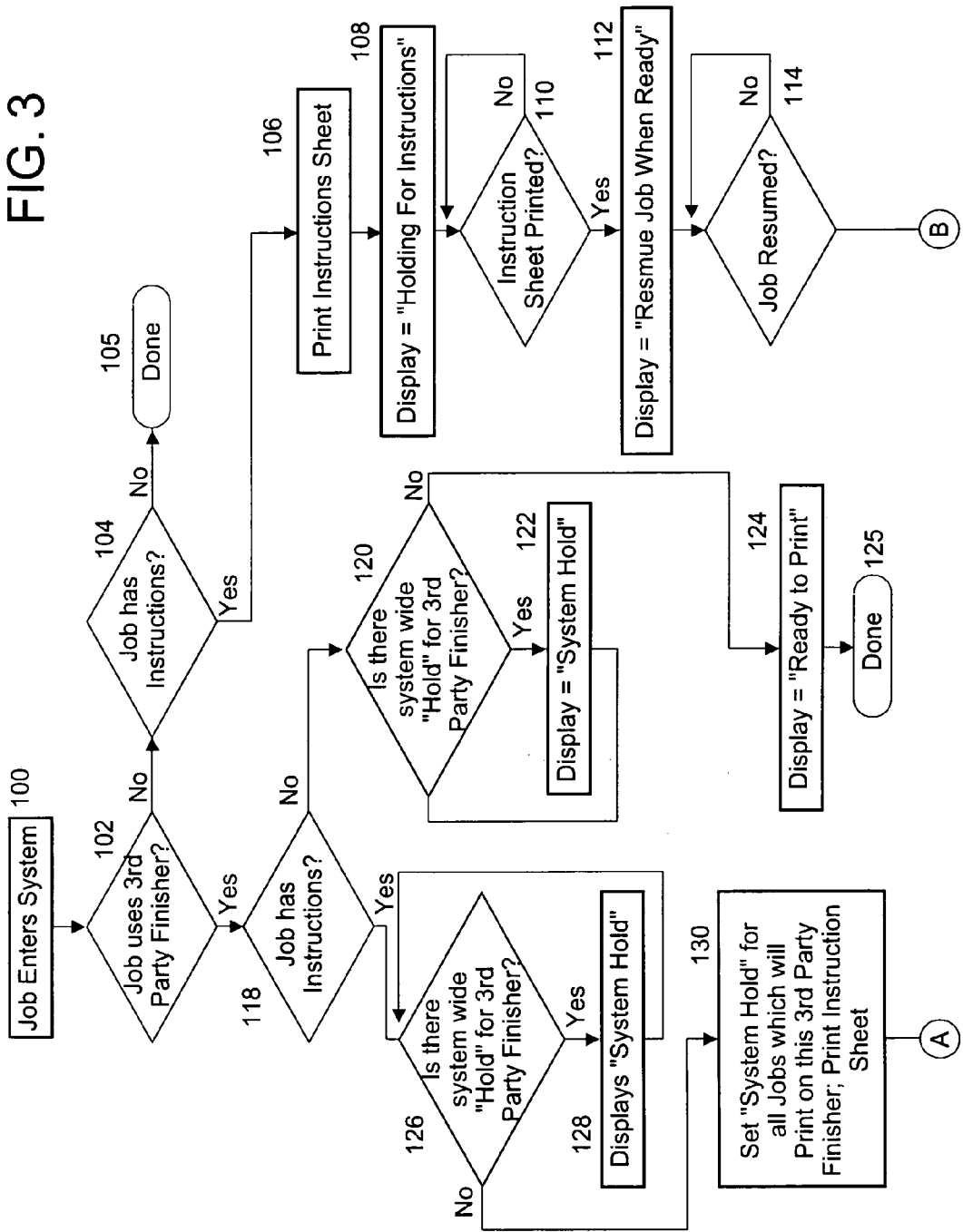
FIG. 3 is a flow diagram illustrating the operation of a typical print system employing the present invention.
Figure 3:
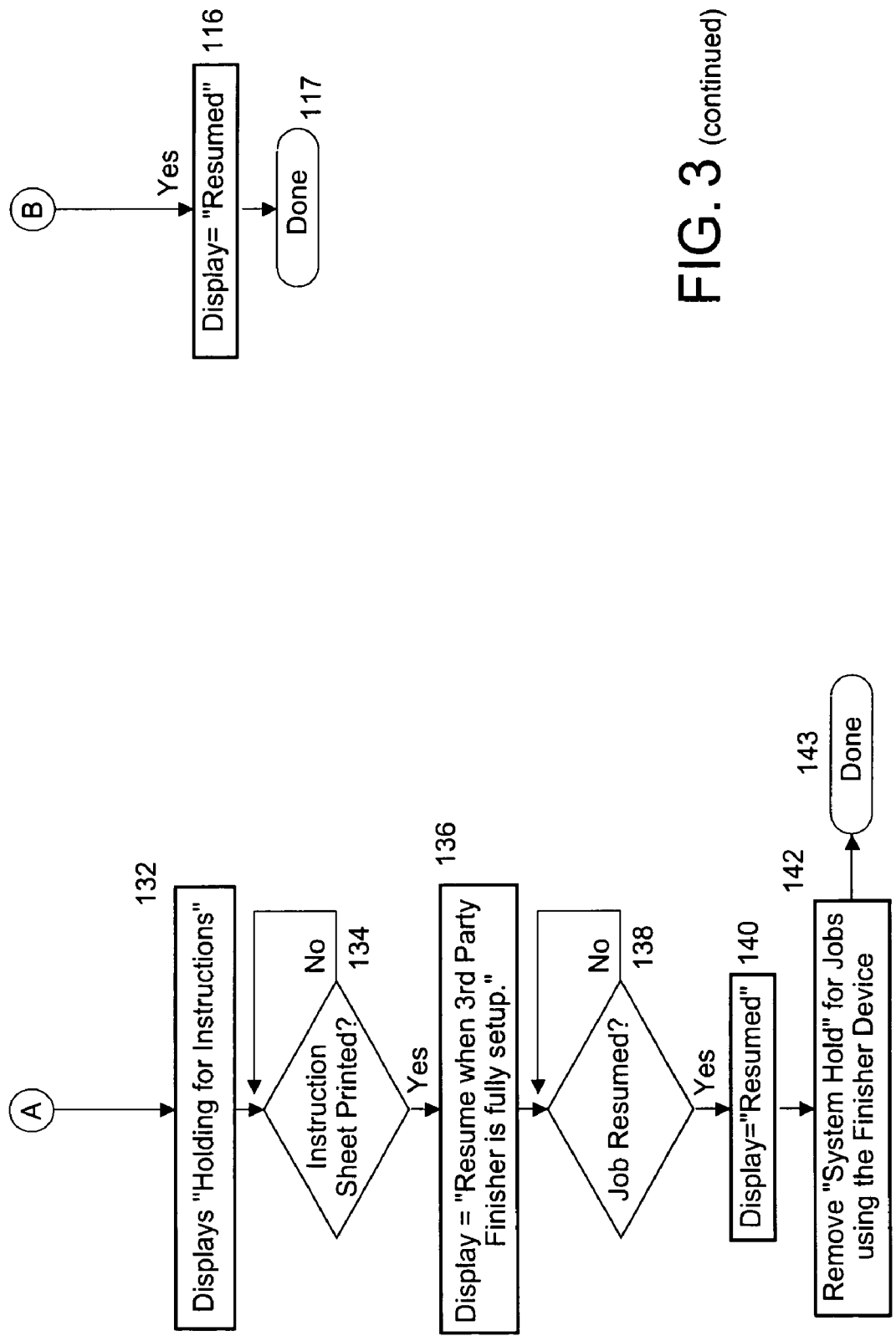

A preferred embodiment of the method of the present invention is demonstrated by the flowchart depicted in FIG. 3. The method includes receiving a print job from the network at Step 100. Step 102 inquires whether the job specifies a third-party finishing device, such as a hole punch or perfect binder. If the response to Step 102 is negative, Step 104 inquires whether there are special instructions specified for the print job. If the response to Step 104 is negative, the print job is allowed to continue to Step 105 in which the print job is transferred to the marking engine and allowed to continue to completion, Step 105. If, however, the response to Step 104 is affirmative, the instructions are printed in Step 106, and the message "Holding for Instructions" is displayed on the printer user interface in Step 108. Step 110 is an inquiry to determine whether the instructions have been printed, and if a negative response is received, Step 110 is repeated until an affirmative response is received.

When an affirmative response is received to Step 110, Step 112 displays the message "Resume Job When Ready" on the printer user interface, followed by Step 114, in inquiry as to whether the job has been resumed. When a negative response is received to Step 114, Step 114 is repeated until an affirmative response is received. When an affirmative response to Step 114 is received, the message "Resumed" is displayed on the printer user interface, and the print job is passed to the marking engine and allowed to continue to completion.

When the response to Step 102 is affirmative, Step 118 inquires whether the job includes operator instructions. If the response to Step 118 is negative, Step 120 inquires whether there is a system "hold" for a third-party finishing device. If the response to Step 120 is affirmative, step 122 displays a "System Hold" message on the printer user interface, and Step 120 is repeated until a negative response is received. When a negative response to Step 120 is received, Step 124 displays a "Ready to Print" message on the printer user interface and the print job is passed to the marking engine and allowed to continue to completion Step 125.

When the response to Step 118 is affirmative, Step 126 inquires whether there is a system hold for a third-party finishing device. If the response to Step 126 is affirmative, Step 128 displays a "System Hold" message on the printer user interface and repeats Step 126 until a negative response is received. When a negative response to Step 126 is received, Step 130 initiates a "system hold" for all print jobs that specify the particular third party finishing device referenced in Step 102 and prints an instruction sheet, listing the instructions entered by the job submitter in entering the job on the network, to the top exit tray. Step 132 displays a "Holding for Instructions" message on the printer user interface, and Step 134 inquires whether the instruction sheet has been printed. If the response to Step 134 is negative, Step 134 is repeated until an affirmative response is received, whereupon Step 136 displays a "Resume When Third-Party Finisher is Fully Setup" message on the printer user interface. Step 138 inquires whether the job has been resumed and, in the case of a negative response, is repeated until an affirmative response is received. When an affirmative response is received to Step 138, Step 140 displays a "Resumed" message on the printer user interface and Step 142 removes the "system hold" for jobs using the finishing device specified in Step 102, the print job is transferred to the marking engine and the job is allowed to continue to completion, Step 143.

When a print job is transferred from the print server queue 27 to the RIP queue 32, if the print job submitter has not entered any text in the instruction field of the job setup menu on the network 28, the RIP 26 sends the print job to the marking engine 40 and the print job is finished. In one embodiment of the invention, when the RIP 26 detects any text in the instructions field, the RIP 26 prints the instruction sheet to the top exit tray 24 according to the operator message and then places the printer 20 in a "system hold" state, automatically holding all incoming print jobs either in the print server queue 27 or in the RIP queue 32. Thus the print system 10 automatically prints the instruction sheet and enters a hold state, without operator intervention, and remains in this state indefinitely until the operator releases the print job, presumably after making the necessary finishing device setup operations.

In an alternative embodiment, the RIP 26 causes the marking engine 40 to print the instruction sheet and causes the print system 10 to enter a hold state only if the instructions include a finishing device 42 selection. If no finishing device 42 is selected, the print job continues to completion without system interruption.

After the instruction sheet is printed and the system 10 enters the "system hold" state, the operator removes the printed instruction sheet from the top exit tray 24 and carries the instruction sheet to the finishing device 42 for reference purposes during set up of the finishing device 42. By carrying the printed instruction sheet to the finishing device 42, the operator is able to refer to the instruction sheet while performing the necessary setup operations at the remote finishing device 42, obviating the need for the operator to remember the instructions and enabling the operator to re-check the settings without walking back to the printer user interface 22. Once the setup instructions are entered on the finishing device user interface 33 or the physical setup operations are performed on the finishing device 42 and rechecked, if necessary, the operator returns to the printer user interface 22 and releases the print job by entering a release code, such as by touching an appropriate region of a touch screen on the printer user interface 22 or by clicking a mouse on a computer screen of the printer user interface 22. Once the job is released, the RIP 26 sends the print job to the marking engine 40 and the print job is completed.

It is to be understood that the foregoing detailed description describes presently preferred embodiments of the invention and that other alternatives, which will become apparent to those of skill in the art upon reviewing the foregoing description, are likewise intended to fall within the scope of the appended claims, including equivalents thereto.

I claim:

1. A method of performing setup operations on a finishing device connected to an electrophotographic printer, the printer having a printer user interface, the method comprising the steps of:
   entering a print job into the printer, the print job including setup instructions for at least one finishing device written as an operator message;
   automatically printing an instruction sheet listing setup operations to be performed prior to completing the print job;
   automatically placing all pending print jobs on hold;
   performing the setup operations listed on the printed instruction sheet;
   entering a release code to thereby release the print job from hold and allow the printer to complete the print job;
   accessing a database of setup instructions that are to be performed on the at least one finishing device;
   retrieving a file from the database containing instructions for a specified finishing device;
   reading the file; and
   translating the file into a page description file that is rasterized and incorporated into the printed instruction sheet.

2. A method of performing setup operations on a finishing device connected to an electrophotographic printer, the printer having a printer user interface, the method comprising the steps of:
   entering a print job into the printer, the print job including setup instructions for at least one finishing device written as an operator message;
   automatically printing an instruction sheet listing setup operations to be performed prior to completing the print job;
   automatically placing on hold all pending print jobs that specify the finishing device;

performing the setup operations listed on the printed instruction sheet;

entering a release code to thereby release the print job from hold and allow the printer to complete the print job;

accessing a database of setup instruction that are to be performed on the at least one finishing device;

retrieving a file from the database containing instructions for a specified finishing device;

reading the file; and translating the file into a page description file that is rasterized and incorporated into the printed instruction sheet.

3. A method of coordinating a printer and an associated finishing device that is connected to the printer, the method comprising the steps of:

receiving, at the printer, a first print job, the first print job including received setup instructions for at least one finishing device that is associated with the first print job;

printing an instruction sheet in response to receiving the received setup instructions, the instruction sheet listing setup operations associated with the first print job, the setup operations to be performed on the at least one finishing device prior to completing the first print job;

placing at least the first print job on hold;

receiving a release code to release the print job from hold and allow the printer to complete the first print job;

accessing a database of internal setup instructions that are to be performed on the at least one finishing device, the internal setup instructions being associated with the received setup instructions;

retrieving a file from the database containing instructions for the at least one finishing device; and translating the file into a page description file that is rasterized and incorporated into the printed instruction sheet.

* * * * *